3,124,506
COMPOSITIONS CONTAINING LACTIC ACID, MALIC ACID, AND SALTS THEREOF

Emmette R. Holman, Palos Verdes Estates, Calif., assignor, by mesne assignments, to Purex Corporation, Ltd., a corporation of California
No Drawing. Filed June 30, 1960, Ser. No. 39,774
11 Claims. (Cl. 167—58)

This invention relates to compositions of matter effective for use as a dentifrice, a prophylactic composition for the nasal cavities and throat, and as a body perspiration odor inhibitor.

It is an object of this invention to provide a versatile class of compositions having a variety of uses of the nature noted above.

The invention is based on the discovery that malic acid and certain salts thereof, when employed in a dentifrice, in a prophylactic composition for washing the nasal cavities or as a gargle, or in a perspiration odor inhibiting composition, improves the effectiveness of these various compositions for their intended purpose. Thus, when employed in a dentifrice, malic acid is effective as a tartar removing agent, antienzyme, and sanitizer. When employed in a nasal wash or gargle, malic acid aids in mobilizing and removing tenacious phlegm deposits from mucous linings of the mouth, nose and throat, and exerts a germicidal action. When employed in a body deodorant composition, malic acid not only functions to alleviate the unpleasant odor due to perspiration, but reduces the perspiration.

I have also found that my above compositions, containing malic acid or a salt thereof, particularly when employed in the form of a solution or a dispersion in a liquid such as water, will remain stable over extended periods by incorporating small amounts of a preservative, e.g. benzoic acid, into the compositions.

I have further found that dentifrices, and prophylactic nasal and throat compositions containing malic acid, have enhanced effectiveness if a salt of lactic acid, preferably calcium lactate, is incorporated into such compositions.

Thus, for example, calcium lactate, when employed in a dentifrice composition containing malic acid according to the invention, improves the effectiveness of the composition for removal of the mucous and salivary plaques from the teeth. While such composition may be employed on natural teeth, the latter composition is especially effective on dentures, false teeth, and related appliances.

When calcium lactate is employed in combination with malic acid in a prophylactic nose and throat composition, the calcium lactate is effective in mobilizing obdurate and tenacious deposits of phlegm from mucous linings of the mouth, nose and throat. It was surprising to find that calcium lactate is substantially non-irritating to the mucous lining of the nasal passages.

The simultaneous application of malic acid and calcium lactate in my dentifrice and prophylactic nose and throat composition is believed to involve a synergistic action between these two components of the compositions. Thus, in my prophylactic nose and throat composition, for example, the malic said appears to enhance the activity of the calcium lactate in loosening and removing tenacious gelatinous phlegm, and this action in turn facilitates the soothing effect of the malic acid on the irritated membranes.

It is to be understood, however, that the invention is not to be taken as limited by any of the aforementioned theories of the function of the malic acid and the calcium lactate in my compositions.

In the above noted compositions, especially in the dentifrice, and prophylactic nose and throat compositions, malic acid itself can be employed, or alternatively, the acid malate salts or the normal malate salts of malic acid, and ammonium, the alkali metals such as sodium or potassium, or non-toxic alkaline earth metals such as calcium or magnesium, provided that where such alkaline earth metal salts and acid salts of malic acid are employed, and the composition is utilized in aqueous solution, e.g. as a nasal wash or gargle, such malate salts are used in quantity such as to maintain them in solution.

Also, in the compositions of the invention, lactic acid can be employed, or salts thereof, for example the ammonium, alkali metal and non-toxic alkaline earth metal salts such as the calcium and magnesium salts. Since the invention composition should be acidic, either the malic acid compound or the lactic acid compound should be present as the free acid. I have found the combination of malic acid and salts of lactic acid, preferably calcium lactate, to be most effective and desirable.

When employed as a dentifrice or as a cleanser for dental plates and appliances, the composition of the invention, preferably including as essential ingredients the malic acid compound and calcium lactate, may be employed in the form of a powder, as a paste, or as a concentrated or dilute suspension or solution of the aforementioned ingredients.

When employed as a dentifrice, the composition may contain, for example, from about 5 to about 50 parts of the malic acid or its aforementioned salts or acid salts, and about 50 to about 95 parts of the lactic acid compound, preferably calcium lactate, by weight.

To the dentifrice composition may be added various additives commonly employed in compositions of this nature. These include, for example, abrasives such as diatomaceous silica to enhance the cleansing action of the composition. To alleviate the distastefulness of the malic acid, flavoring materials such as oil of cassia, oil of peppermint, oil of wintergreen, or saccharin can be incorporated. Coloring materials, sanitizers and disinfectants can also be incorporated.

As previously indicated, the dentifrice composition can be formulated to produce a concentrated paste or the composition can be further diluted with water to produce a liquid dentifrice having a suitable concentration of the essential components, namely the malic acid component and the calcium lactate.

When the invention composition comprising preferably calcium lactate and the malic acid compound, for example malic acid, is employed as a prophylactic composition or wash for nasal use or as a gargle, the composition can be packaged in powder form and then added to water prior to or at the time of use. In the form of a solid composition for this purpose, the amount of lactic acid compound, e.g. calcium lactate, employed may range from about 9 to about 90 parts by weight and the amount of malic acid compound employed can range from about 2 to about 18 parts by weight. A small amount of preservative such as benzoic acid can be incorporated. When such composition is employed in aqueous solution, the concentration of the essential ingredients can range from about 9 to about 90 grams of lactic acid compound such as calcium lactate, and the amount of malic acid compound can range from about 2 to about 18 grams, per liter of solution.

A concentrated solution or dispersion of the ingredients forming the prophylactic composition can be formulated in water or other suitable vehicle and the material diluted to a proper working concentration within the ranges noted above prior to use.

The prophylactic composition or wash can contain various other additives including surfactants, anti-enzymes, flavoring materials, colorants, and emollients. Specific materials of this type may include, for example, lauryl sulfate, polyethylene oxide derivatives of nonyl phenol or octyl phenol, hexitol anhydride fatty acid esters, sorbitan fatty acid, e.g. monolaurate, polyoxyalkylene compounds, dehydro acetic acid or sodium sarcosinate as anti-enzymes, and also natural or synthetic sweeteners, glycerin, glycol, sorbitol.

I have found from experience that the nasal spray composition produces practically immediate release of phlegm deposits which are mostly eliminated by mouth. The release and discharge continues for a few minutes and then tapers off rapidly. The action is very penetrating, and also aids in opening and cleaning the tear ducts draining into the nasal cavity. Drainage of the sinus cavities may also be affected by employing the prophylactic wash.

In employing the invention composition as a body deodorant or as a perspiration odor inhibitor, the composition can be employed in the form of a solution, that is, an aqueous solution of the malic acid compound, preferably malic acid, containing a preservative such as benzoic acid. In aqueous solutions of this type the concentration of malic acid which is suitable can range from about 3 to 30% of malic acid by weight of the solution.

To this solution may be added, in addition to the preservative, anti-enzymes, perfuming materials, colorants, emollients and thickeners. Illustrative materials of this type include, for example, materials marketed as hexachlorophene, Actamer, Irgasan BS–200, or equivalent compositions, and materials such as Carbowax.

Hexachlorophene is believed to be composed essentially of 2,2'-methylene-bis(3,4,6-trichlorophenol), and having the following formula:

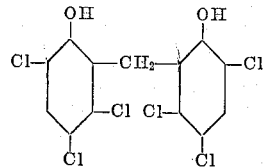

Actamer is believed to be composed essentially of 2,2'-thio-bis(4,6-dichlorophenol) and having the formula:

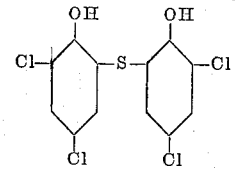

Irgasan BS–200 is believed to be composed essentially of tetrachloro salicyl anilide and having the formula:

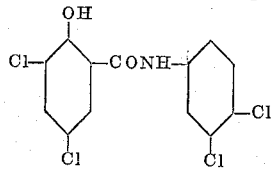

Carbowax is composed essentially of a mixture of solid waxy polyoxyethylene glycols.

Solutions of the deodorant composition can be applied by spray, squeeze bottle or roller applicator to those parts of the body which it is desired to treat. The composition has been found particularly effective for treatment of perspiration of the feet and the armpits.

In such solutions the concentration of malic acid may range from about 2 to about 20%, and the concentration of hexachlorophene from about 0.5 to about 10% by weight of solution, the balance being alcohol or glycerine. A typical example of such a solution is one which contains by weight 10% malic acid, 4% hexachlorophene, 10% glycerine, and 76% of an alcohol such as isopropanol. The alcohol and/or glycerine may be present in an amount up to about 95% by weight of the solution.

The above aqueous solutions can be absorbed in a powder or carrier, if desired, such as talcum powder, and the powder employed as a deodorant. Further, a textile cloth, for example, a suitably woven or felted fibrous absorbent material or a disposable pad can be impregnated with the aforementioned deodorant solutions and employed to treat those portions of the body which require treatment. Further, portions of clothing, particularly those which are adjacent the armpits, or foot pads which can be placed in the shoe or stocking, can be treated with the malic acid-containing deodorant, to provide effective treatment.

A particularly effective form in which the deodorant composition can be employed is as an unguent semi-solid composition, for example, in stick form, in which the vehicle or material containing the malic acid constituent is a semi-solid unguent material, for example, Carbowax. In such a composition it is preferred also to employ hexachlorophene, Actamer or Irgasan BS–200, most desirably hexachlorophene, together with the malic acid. The malic acid and hexachlorophene are readily incorporated in the Carbowax or equivalent thickener by first dissolving the hexachlorophene and malic acid in an alcohol and adding such solution to Carbowax. This provides a semi-solid unguent composition which can be readily applied to the skin of those portions of the body to be treated. The hexachlorophene or equivalent material cooperates with the malic acid compound to control the growth and spread of obnoxious odor-producing microorganisms contained within the epidermis. The activity of either of these ingredients is greatly enhanced by the presence of the other.

In such unguent deodorant compositions the amount of malic acid compound or malic acid present may range from about 1 to about 10% by weight of the composition and the amount of hexachlorophene or equivalent material such as Actamer or Irgasan BS–200, from about 0.25% to about 3%. Alcohol, glycerine, or mixtures thereof may be employed as an aid in incorporating the malic acid compound and hexachlorophene into the Carbowax. The alcohol, glycerine or mixtures thereof may be present in amounts up to about 10% by weight of the total composition. The remainder of the composition is composed essentially of Carbowax or equivalent semi-solid, usually present in an amount of about 60 to about 95% by weight of the composition, and sufficient to confer the desired unguent consistency.

The following are examples of practice of the invention.

*Example 1*

The following composition in the form of a powder designated composition A is prepared:

| | Parts by weight |
|---|---|
| Calcium lactate | 60 |
| Malic acid | 12 |

Composition A was used as a dentifrice on natural teeth and also on false teeth and dental appliances. After the second application of composition A on natural teeth, substantial removal of tartar was observed. Since a certain degree of temperature sensitivity and bite sensitivity is observed if the treatment is extended for longer periods of time, this composition should be used primarily for corrective rather than habitual treatment. However, composition A may be used routinely for dental appliances. In such application it was observed that after a two week period of use employing treatment once a day, substantially complete tartar removal was observed without detrimental effect on the dental appliances.

*Example 2*

The following composition B was prepared:

| | Parts by weight |
|---|---|
| Diatomaceous silica | 50 |
| Calcium lactate | 60 |
| Malic acid | 12 |

The same procedure as described in Example 1 is followed for applying composition B to both natural teeth, and to false teeth and appliances. Results similar to those in Example 1 are obtainable.

*Example 3*

The following composition C was prepared:

| | Grams per liter |
|---|---|
| Calcium lactate | 60 |
| Malic acid | 12 |
| Water, 1 liter. | |

Composition C was tested on both natural teeth, and false teeth and appliances in the manner described in Example 1. Similar results were observed with respect to the application of composition C as in the case of composition A.

*Example 4*

The following composition D was prepared:

| | Grams per liter |
|---|---|
| Calcium lactate | 60 |
| Malic acid | 12 |
| Benzoic acid | 0.5 |
| Water, 1 liter. | |

Composition D was similarly tested as in the case of composition A for application both to natural teeth, and to false teeth and appliances. Results similar to those realized in connection with composition C were obtained and it was further noticed that whereas composition C over a period of time produced a slight cloudiness or precipitation, composition D containing benzoic acid remained clear.

*Example 5*

Compositions C and D of Examples 3 and 4 above were employed as a nasal spray over a period of three days, using 4 to 5 treatments a day. It was observed that the nasal spray treatment employing compositions C and D produced immediate release of phlegm deposits which were eliminated mostly by mouth.

The relatively sour taste of the composition due primarily to the presence of the malic acid can be alleviated by incorporating in compositions C and D sweeteners such as sugar, saccharin, sorbitol, or fruity or spicy flavorings.

*Example 6*

The following compositions E and F were prepared.

Composition E:

| | Grams per liter |
|---|---|
| Calcium lactate | 60 |
| Malic acid | 6 |
| Water, 1 liter. | |

Composition F:

| | Grams per liter |
|---|---|
| Lactic acid | 60 |
| Calcium malate | 8 |
| Water, 1 liter. | |

Employment of compositions E and F as a nasal spray or as a gargle over the same period and for the same treating schedule each day as in Example 5 produced results similar to those noted in Example 5.

*Example 7*

The following composition G was prepared:

| | |
|---|---|
| Malic acid | grams per liter 100 |
| Water | liter 1 |

Composition G was first applied as an inhibitor of foot odor and it was observed that the application of composition G in this manner not only relieved the odor but reduced the amount of perspiration causing the odor.

Composition G was also applied as an underarm deodorant by atomizing the solution into the axilla following a bath and allowing the solution to dry. Underarm odor was materially reduced as well as the perspiration. No visible lesions nor redness resulted from such treatment regularly for a period of over one year. A feeling of dryness is initially observed, but this disappears in a few minutes after application.

*Example 8*

The following composition H was prepared:

| | Percent by weight |
|---|---|
| Malic acid | 8 |
| Hexachlorophene | 2 |
| Alcohol | 10 |
| Carbowax | 80 |

This composition was prepared by adding malic acid and hexachlorophene to the alcohol, and incorporating the resulting solution in Carbowax.

Composition H is an unguent semi-solid material, and when applied in stick form for inhibiting odor from the feet or armpits was efficient both in reducing the odor and the perspiration.

*Example 9*

Compositions J and K having odor inhibiting properties similar to the composition H of Example 8 may be prepared by substituting for the hexachlorophene of composition H, 2% by weight of Actamer, and 2% by weight of Irgasan BS–200, respectively.

*Example 10*

A concentrate L was prepared having the following composition:

| | Grams |
|---|---|
| Malic acid | 25 |
| Hexachlorophene | 10 |
| Isopropyl alcohol | 65 |

A composition M was prepared having the following formulation:

| | Grams |
|---|---|
| Concentrate L | 40 |
| Glycerin | 10 |
| Isopropyl alcohol | 50 |
| Eau de Cologne | Minor amount |

Composition M is effective as a deodorant spray for treatment of the feet or for underarm treatment.

A composition N was prepared having the following composition:

| | Grams |
|---|---|
| Carbowax 4000 (Carbide & Carbon) | 80 |
| Glycerin | 10 |
| Concentrate L | 20 |

Composition N was prepared by melting the Carbowax at 150 to 155° F., mixing the glycerin therewith and adding concentrate L. The product on cooling formed an unguent composition. If desired, menthol and/or a perfume may be added.

Such composition in stick form is effective as an underarm deodorant.

It is accordingly seen that the invention provides a class of compositions having surprising effectiveness as a dentifrice, a nasal spray or gargle, as a body odor and perspiration inhibitor.

While I have described particular embodiments of my invention for the purpose of illustration, it should be understood that various modifications and adaptations thereof may be made within the spirit of the invention as set forth in the appended claims.

I claim:

1. A composition effective as a dentifrice and prophylactic nose and throat composition which consists essentially of a substance of the class consisting of lactic acid and the ammonium, alkali metal and non-toxic alkaline earth metal salts of lactic acid, and a member of the group consisting of malic acid, and the ammonium, alkali metal and non-toxic alkaline earth metal salts and acid salts of malic acid.

2. A dentifrice which consists essentially of calcium lactate and a member of the group consisting of malic acid, and the ammonium, alkali metal and non-toxic alkaline earth metal salts and acid salts of malic acid.

3. A dentifrice which consists essentially of calcium lactate and a member of the group consisting of malic acid, and the ammonium, alkali metal and non-toxic alkaline earth metal salts and acid salts of malic acid, and a minor proportion of benzoic acid.

4. A dentifrice which consists essentially of about 50 to about 95 parts by weight of calcium lactate and about 5 to about 50 parts by weight of a member of the group consisting of malic acid, and the ammonium, alkali metal and non-toxic alkaline earth metal salts and acid salts of malic acid.

5. A dentifrice which consists essentially of about 50 to about 95 parts by weight of calcium lactate and about 5 to about 50 parts by weight of malic acid.

6. A dentifrice in the form of a powder which consists essentially of about 50 to about 95 parts by weight of calcium lactate, about 5 to about 50 parts by weight of malic acid, and an abrasive.

7. A prophylactic nose and throat composition consisting essentially of about 9 to 90 parts by weight of calcium lactate and about 2 to about 18 parts by weight of a member of the group consisting of malic acid, and the ammonium, alkali metal and non-toxic alkaline earth metal salts and acid salts of malic acid.

8. A prophylactic wash for the nasal cavities and the throat, which consists essentially of a solution in water of about 60 grams of calcium lactate, about 12 grams of malic acid and about 0.5 gram of benzoic acid, per liter of solution.

9. A prophylactic wash for the nasal cavities and the throat, which consists essentially of a mixture in a liquid vehicle, of about 9 to about 90 grams per liter of calcium lactate and about 2 to about 18 grams per liter of malic acid.

10. A dentifrice which consists essentially of about 50 to about 95 parts by weight of a substance of the class consisting of lactic acid and the ammonium, alkali metal and non-toxic alkaline earth metal salts of lactic acid, and about 5 to about 50 parts by weight of a member of the group consisting of malic acid, and the ammonium, alkali metal and non-toxic alkaline earth metal salts and acid salts of malic acid.

11. A prophylactic nose and throat composition consisting essentially of about 9 to 90 parts by weight of a substance of the class consisting of lactic acid and the ammonium, alkali metal and non-toxic alkaline earth metal salts of lactic acid, and about 2 to about 18 parts by weight of a member of the group consisting of malic acid, and the ammonium, alkali metal and non-toxic alkaline earth metal salts and acid salts of malic acid.

References Cited in the file of this patent

UNITED STATES PATENTS

| | | |
|---|---|---|
| 1,275,275 | Levinson | Aug. 13, 1918 |
| 2,522,410 | Bluhm et al. | Jan. 6, 1925 |
| 2,554,464 | Kraus | May 22, 1951 |
| 2,554,465 | Kraus | May 22, 1951 |
| 2,900,306 | Slater | Aug. 18, 1959 |

OTHER REFERENCES

Sumner et al.: The Enzymes, vol. II, part I, Academic Press, publ., N.Y. (1951), page 773.

Cooper et al.: Chem. Abst., vol. 52, 1958, col. 6482g.

Merck Index, 6th ed., Merck and Co., Rahway, N.J. (1952), p. 128.

Merck Index, 6th ed., Merck and Co., Rahway, N.J., 1952, p. 596.

Fruton et al.: General Biochemistry, John Wiley and Sons, N.Y., 1953, pp. 466–471.